US005493085A

United States Patent [19]

Kolberg et al.

[11] Patent Number: 5,493,085

[45] Date of Patent: Feb. 20, 1996

[54] SPRING CLIP ASSEMBLY FOR ELECTRICAL CONNECTIONS TO FLAT STABS AND SWITCHES INCORPORATING THE SAME

[75] Inventors: Kenneth D. Kolberg, Monroeville; David E. Little, South Beaver; David A. Parks, Economy Borough, all of Pa.

[73] Assignee: Eaton Corporation, Cleveland, Ohio

[21] Appl. No.: 389,870

[22] Filed: Feb. 17, 1995

[51] Int. Cl.$^6$ ...... H02B 1/04

[52] U.S. Cl. ...... 200/51 R; 361/624; 439/814

[58] Field of Search ...... 403/362; 200/284, 200/293, 51 RX, 50 AA; 335/15, 202; 439/715, 716, 791, 801, 805, 810–814; 361/605, 622, 624, 634, 637, 641, 643, 648, 673

[56] References Cited

U.S. PATENT DOCUMENTS

| | | | |
|---|---|---|---|
| 2,205,322 | 6/1940 | Thomas, Jr. et al. | 173/269 |
| 2,585,728 | 2/1952 | Bedford, Jr. | 15/41.76 |
| 2,633,886 | 4/1953 | Tinnerman | 151/41.75 |
| 3,559,156 | 1/1971 | Coley | 339/272 |
| 3,891,298 | 6/1975 | Yorgin | 339/272 R |
| 4,059,335 | 11/1977 | Simon | 339/272 |
| 4,629,281 | 12/1986 | Kruger | 339/272 |
| 4,961,553 | 10/1990 | Todd | 248/62 |
| 5,005,104 | 4/1991 | Grunert et al. | 361/355 |
| 5,107,396 | 4/1992 | Rosen | 361/355 |
| 5,119,054 | 6/1992 | Grunert et al. | 335/35 |
| 5,189,596 | 2/1993 | Runge | 361/355 |
| 5,206,789 | 4/1993 | Barby | 361/355 |

OTHER PUBLICATIONS

Cutler–Hammer, Westinghouse & Cutler–Hammer products; Publication No. 29–120F; *Series C F–Frame Termination Accessories;* Jun. 1994; pp. 7–10.

*Primary Examiner*—Gerald P. Tolin
*Attorney, Agent, or Firm*—Martin J. Moran

[57] ABSTRACT

A terminal connection for a flat stab of an electrical switch includes a spring clip which retains a nut in alignment with an aperture in the flat stab. The spring clip is fabricated from a strip of resilient electrically conductive material and has a top wall with a central aperture, side walls extending downward from the top wall and having slots therein, an end wall extending downward from the top wall and a bottom wall cantilevered forward from the bottom of the end wall under the top wall and between the side walls. A square nut is retained in the spring clip with its tapped hole aligned with the aperture in the top wall and with either an aperture or a depression in the bottom wall. The fastener assembly clips onto the end of the flat stab with the stab between the nut and the top wall of the spring clip. A screw passed through the apertures in the top wall and the flat stab engages the nut to secure a conductor to the stab. The slots in the side walls of the clip prevent rotation of the nut and provide positive stops which resist loss of the nut through application of excessive axial force to the screw.

14 Claims, 2 Drawing Sheets

SPRING CLIP ASSEMBLY FOR ELECTRICAL CONNECTIONS TO FLAT STABS AND SWITCHES INCORPORATING THE SAME

BACKGROUND OF THE INVENTION

1. Field of the Invention

This invention relates to electrical terminations and particularly to such terminations which include an assembly for securing a nut in alignment with an aperture in a flat stab of an electrical switch for receipt of a screw which threads into the nut to fasten an electrical conductor to the flat stab.

2. Background of Information

Electrical switches, including circuit breakers, contactors, motor controllers, motor starters and switches without overload protection, often have flat stabs for connecting the switch to conductors of the electrical system in which the switch is used. Many types of terminal connections are used with such switches, but in a widely used simple connection a spade or eye termination on the electrical conductor is clamped to the stab by a screw passed through an aperture in the stab and secured by a nut. Flat conductors can be secured to the stab in a similar manner with the screw passing through an aperture in the flat conductor as well.

Typically, the stabs are protected within recesses in the switch housing which makes access difficult. For ease in making such connections, it is known to secure the nut to the stab in alignment with the aperture so that only the screw needs to be manipulated. In one such connection, the nut has an annular flange around the tapped hole which is press fit into the aperture in the stab to retain the nut. Thus, special nuts must be provided for each size aperture in the stabs. Also, the nut can be dislodged and dropped by excess pressure applied to the screw before the threads are fully engaged.

In another arrangement, a flat piece of copper and a steel nut are held in spaced relation with an aperture in the piece of copper aligned with the tapped hole in the nut by a flexible bridge along one edge to form a keeper which clips onto the stab. Maintaining alignment is difficult, and again, excess pressure on the screwdriver can displace the steel nut.

In yet another keeper arrangement, a thin piece of copper is bent to form a u-shaped clip with a top wall, an end wall and a bottom wall. A square nut with ears on opposite sides is retained within the u-shaped clip with its tapped hole aligned with holes in the top and bottom walls, and is at the same time prevented from turning, by tabs on the side edges near the free end of the bottom wall. Additional tabs bent down from the sides of the top wall engage the ears on the nut to space it from the top wall to make room for applying the clip to the stab with the stab between the nut and the top wall. The resilient sheet material used for the clip clamps the nut against the stab. One difficulty with this u-shaped spring clip is that excessive axial force on the screw driver bends the bottom wall downward so that the nut can not be engaged by the screw.

Them is a need for an improved arrangement for electrical connections for switches having flat stabs which are not easily accessible. There is a further need for such electrical connections which provide secure retention of a terminal nut in alignment with an aperture in the stab despite application of excess force to the screw during engagement of the nut by the screw.

There is an additional need for such a connection which is economical and is easily installed without the need for any special tools.

SUMMARY OF THE INVENTION

These needs and others are satisfied by the invention which is directed to a fastener assembly for securing an electrical conductor to a flat stab and to the combination of such a fastener assembly with an electrical switch having such a flat stab and an electrical conductor for connection to the stab. The fastener assembly includes a clip comprising a top wall having a central aperture, a pair of side edges, and first and second end edges. A pair of side walls, having slots therein, extend downward from the side edges of the top wall. An end wall extends downward from one end of the top wall and has a bottom edge from which a bottom wall is cantilevered under the top wall. The top, side, and bottom walls form a pocket. A flat nut with lateral projections is retained in the pocket, with a tapped center hole in the nut in registration with the central aperture in the top wall, by engagement of the lateral projections in the slots in the side walls. The fastener assembly clamps onto the flat stab with the stab received in the pocket between the nut and the top wall. The clip is made preferably from a single piece of electrically conductive resilient material so that the nut is clamped in position against the stab.

To help align the fastener assembly with the aperture in the stab, and to assure retention of the fastener in that position, an axial projection around the aperture in the top wall, preferably in the form of an annular flange, engages the aperture in the stab.

Preferably, the nut is rectangular with ears projecting laterally outward from opposite sides to engage the slots in the side walls of the clip. These slots not only prevent rotation of the nut, but also provide firm support for the nut so that it can not be displaced by excess axial force applied to the screw.

As an additional feature, the bottom wall can be provided with a depression in place of an aperture with the depression aligned with the aperture in the top wall, and therefore, the nut also. This first of all, prevents the fastener assembly from being applied to the stab upside down, but also, prevents the use of an excessively long screw which could cause a short where the switch is mounted on an electrically conductive panel.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
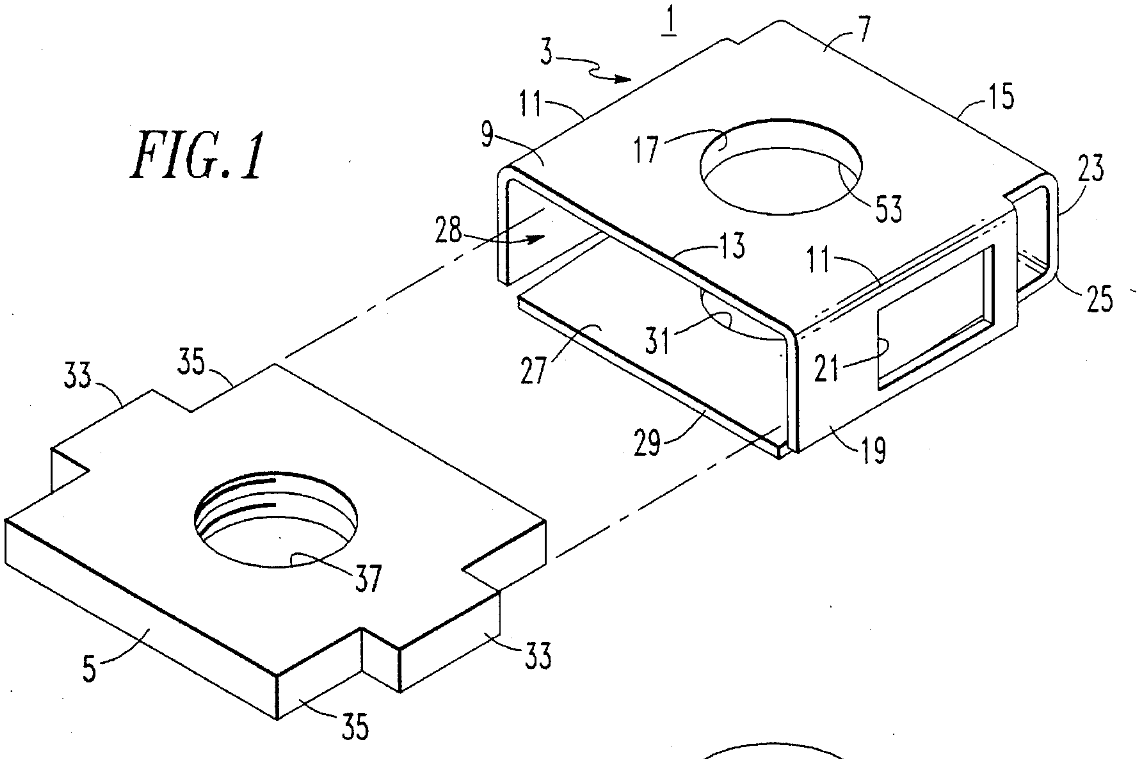
FIG. 1 is an exploded isometric view of a fastener assembly in accordance with one embodiment of the invention.

The invention will be described as applied to electrical connections for stabs on electrical switches such as circuit breakers, contactors, transfer switches, motor controllers, motor starters, as well as, switches without protection functions. As shown in FIG. 1, such connections have a fastener assembly 1 which includes a spring clip 3 and a nut 5. The spring clip 3 is fabricated from a single piece of electrically conductive resilient material 7 such as a thin copper sheet. This sheet of material 7 is formed into a top wall 9 having a pair of side edges 11, a front edge 13 and a rear edge 15 and a central aperture 17. A pair of side walls 19 extend downward from the side edges 11. The side walls each have a closed slot 21. An end wall 23 extends downward from the rear edge 15 of the top wall and terminates in a bottom edge 25. A bottom wall 27 is cantilevered forward from the bottom edge 25 of the rear wall under the top wall 9 between the side walls 19 and terminates in a free edge 29. This bottom wall 27 has a central aperture 31 coaxial with the central aperture 17 in the top wall 9. As the strip material 7 is resilient, the bottom wall can be resiliently deflected relative to the top wall 9. The top wall 9, side walls 19, end wall 23 and bottom wall 27 form a pocket 28 in which the nut 5 is retained.

The nut 5 has a pair of lateral projections 33. Preferably the nut is rectangular, and most preferably square, with projections 33 forming ears on opposed sides 35 of the nut 5. The nut 5 is retained within the spring clip 3 by engagement of the ears 33 in the slots 21. With the nut 5 so retained in the spring clip 3, the tapped hole 37 in the nut 5 is coaxially aligned with the aperture 17 in the top wall 9 and the aperture of the bottom wall 27.

Figure 3:
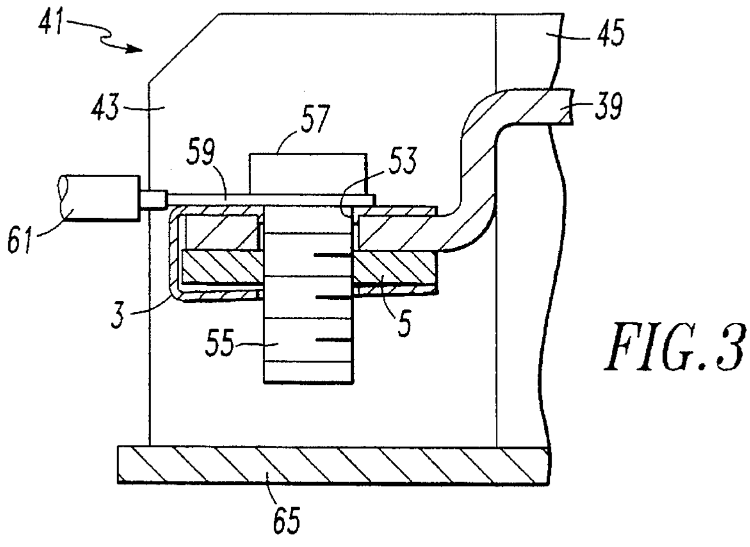
FIG. 3 is a fragmentary vertical section through a portion of an electrical switch incorporating the fastener assembly of FIGS. 1 and 2.
Figure 4:
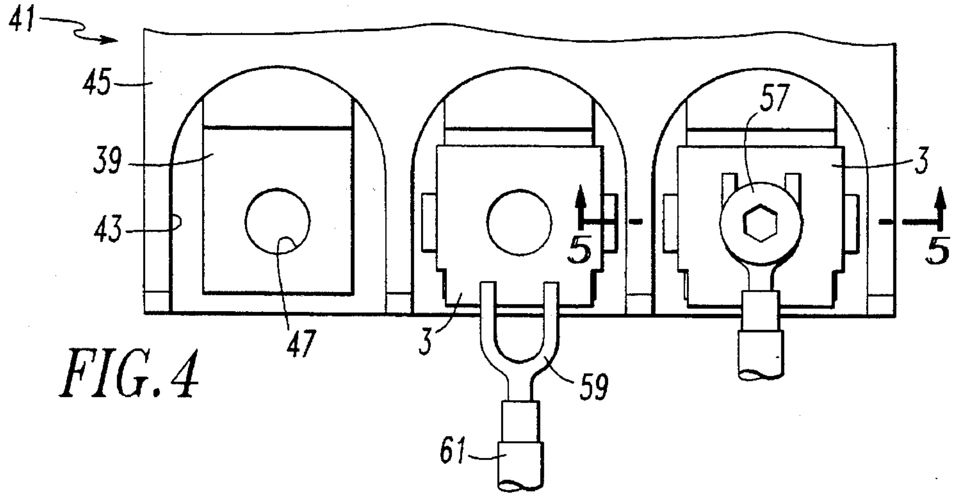
FIG. 4 is a fragmentary plan view of the portion of an electrical switch illustrated in FIG. 3.

The fastener assembly 1 is used in connection with flat stabs such as the stab 39 which forms a terminal for a molded case switch 41 such as is shown in FIGS. 3 and 4. As will be seen from the figures, the flat stab 39 is located in a recess 43 in the molded housing 45 of the switch 41. The flat stab 39 has an aperture 47 spaced from its free edge 49.

The fastener assembly 1 is snapped onto the free end 49 of the stab 39 with the stab 39 between the nut 5 and the top wall 9 of the clip 3. The resiliency of the clip 3 allows the fastener assembly 1 to accommodate different thicknesses t of the flat stab 39 with the maximum thickness limited by the distance d between the bottom edges 51 of the slots 11 and the top wall 9 as reduced by the thickness of the nut 5.

The fastener assembly 1 retains the nut 5 on the stab 39 with the tapped hole 37, as well as the apertures 17 and 31, in alignment with the aperture 47 in the stab 39. Preferably, the aperture 17 in the top wall 9 is provided with downwardly extending projection in the form of an annular flange or burr 53 which engages the aperture 47 in the stab 39 to resist the removal of the fastener assembly from the stab 39. The flange 53 need not be an exact fit in the aperture 47 as its purpose is only to prevent sliding of the fastener assembly laterally and not to secure the nut to the stab as in the case of the prior art nuts with a press fit collar mentioned above. A screw 55 is passed through the aperture 17 in the top wall 9 of the clip 3 and through the aperture 47 in the stab 39 to engage the tapped bore 37 in the nut 5 retained in place by the clip 3. The screw 55 has a head 57 which engages a termination such as the spade terminal 59 secured to the end of the conductor 61 to mechanically and electrically connect the conductor 61 to the stab 39. Other types of termination can be used in place of the spade terminal 59, and in fact, the conductor 61 could be a flat conductor with an aperture, through which the screw 55 passes. One of the problems with the prior art spring clip nut retainer discussed above, was that excessive downward pressure applied to the screw 55 could push the bottom wall of the clip downward so that the nut was lost. The present invention overcomes this problem, as the ears 33 of the nut 5 are engaged by the slots 11 in the side walls 19. Thus, axial force applied to the screw 55 is transmitted through the ears 33 of the nut 5, and resisted by the bottom edges 51 of the slots 11 so that the force is then transmitted to the top wall 9 and resisted by the flat stab 39. The side edges 63 of the slots 11 prevent rotation of the nut 5 and maintain the nut in a plane perpendicular to the screw 55 so that positive engagement of the nut can be made by the screw 55.

Figure 2:
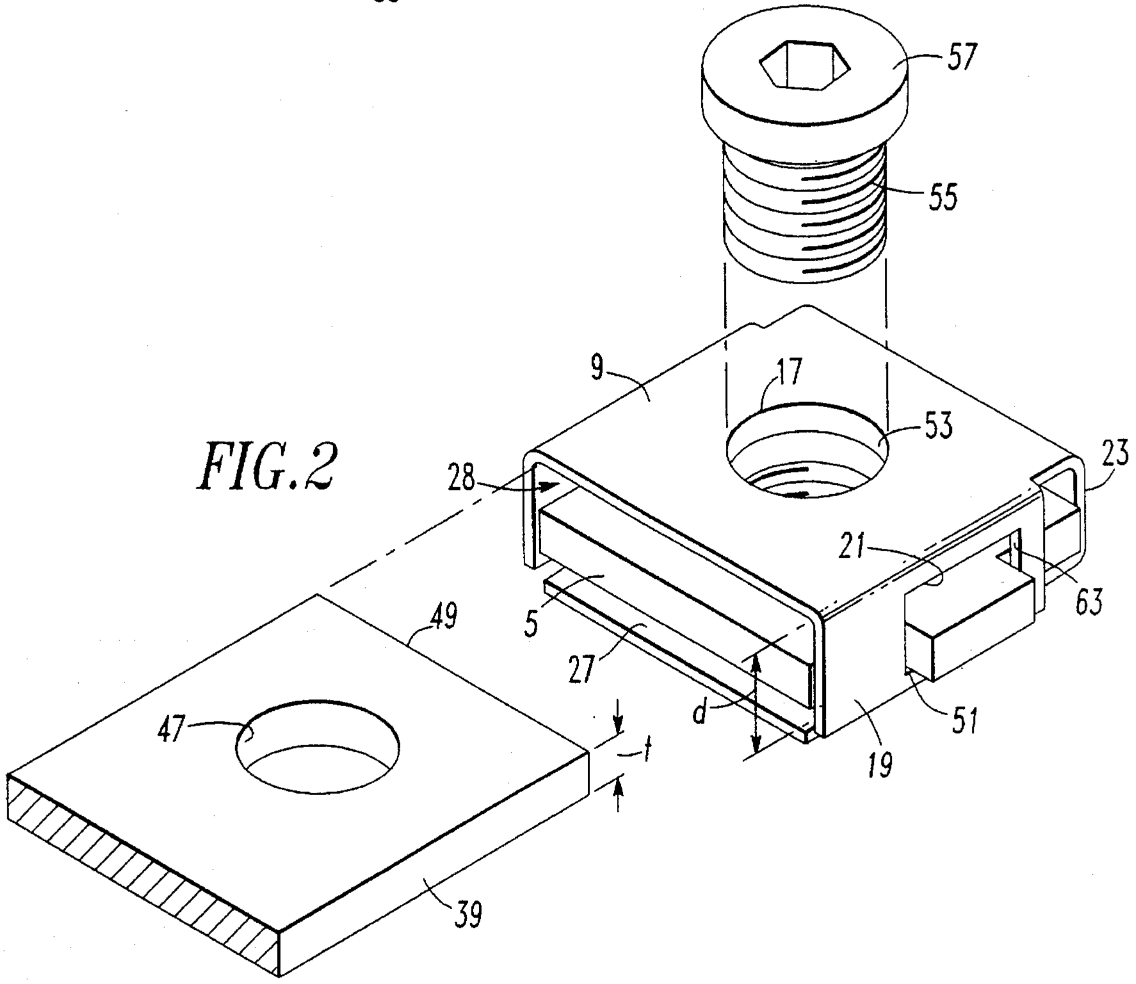
FIG. 2 is an isometric view of the fastener assembly of FIG. 1 shown in relation to circuit breaker stab on which it can be mounted.
Figure 5:
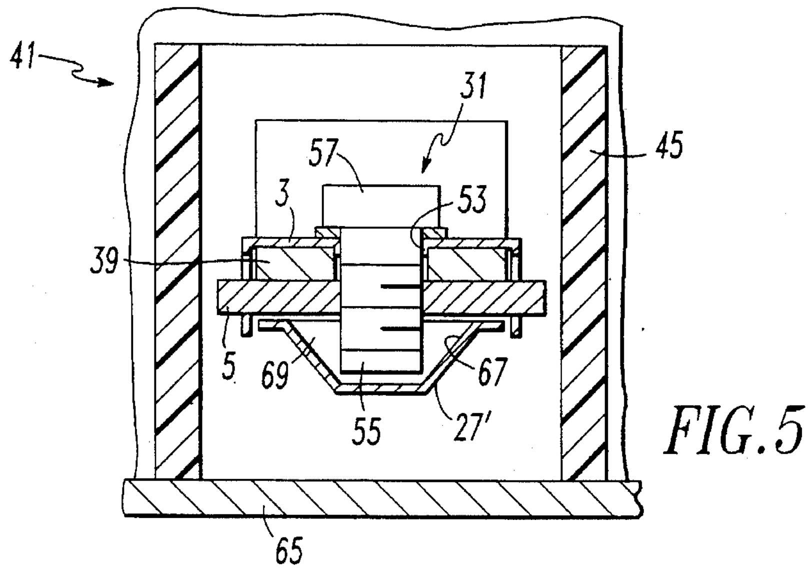
FIG. 5 is a vertical section through a fastener assembly in accordance with a second embodiment of the invention mounted on a stab of the electrical switch shown in FIGS. 3 and 4.

In an installation where the switch 41 is mounted on an electrically conductive panel 65 (see FIG. 3) the use of an excessively long screw 55 could short the flat stab 39 to the panel 65. The embodiment of the invention shown in FIG. 5 prevents this from occurring. The bottom wall 27' of the clip 3' shown in FIG. 5 is not provided with a central aperture like the aperture 31 in the embodiment of the clip shown in FIGS. 1–3. Instead, the bottom wall 27' has a downward depression 67 forming a cavity 69 aligned with the tapped hole 37 in the nut 5. The fact that there is no aperture in the bottom wall 27' also prevents this embodiment of the fastener assembly 1' from being applied to the stab 39 upside down wherein the nut 5 would be above the stab 39 and therefore not secure the electrical conductor 61 to the stab 39.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A fastener assembly for securing an electrical conductor to a flat stab having an aperture spaced from a free end of said stab, said assembly comprising:

a clip comprising a top wall having a central aperture, a pair of side edges 11, a front edge 13 and a rear edge 15; a pair of side walls extending downward from said pair of side edges of said top wall and having slots therein; an end wall extending downward from said rear edge of said top wall and having a bottom edge; and a resilient bottom wall cantilevered from said bottom edge of said end wall under said top wall and terminating in a free edge spaced from said top wall to form with said top wall, said side walls and said end wall a pocket; a flat nut with a tapped center hole and lateral projections retained in said pocket with said tapped center hole in registration with said central aperture in said top wall by engagement of said projections in said slots in said side walls; said clip sliding onto said free end of said stab which is received in said pocket between said top wall and said nut to clamp said nut against said stab with said tapped hole in said nut in registration with said aperture in said stab as well as said aperture in said top wall.

2. The assembly of claim 1 wherein said clip is made from a single piece of electrically conductive spring material, said side walls being bent downward from said top wall along said side edges, said end wall being bent downward from said top wall along said rear edge of said top wall and said bottom wall being bent inward under said top wall along said bottom edge of said end wall.

3. The assembly of claim 1 wherein said central aperture in said top wall has an axial projection engaging said aperture in said stab to retain said clip on said stab.

4. The assembly of claim 3 wherein said axial projection is an axially extending flange.

5. The assembly of claim 4 wherein said nut is generally rectangular with opposed sides and said projections comprise ears extending laterally outward form said opposed sides.

6. The assembly of claim 5 wherein said clip is made from a single piece of electrically conductive spring material, said side walls being bent downward from said top wall along said side edges, said end wall being bent downward from said top wall along said rear edge of said top wall, and said bottom wall being bent inward under said top wall along said bottom edge of said end wall.

7. The assembly of claim 1 wherein said nut is generally rectangular with opposed sides and said projections comprise ears extending laterally outward form said opposed sides.

8. The assembly of claim 1 wherein said bottom wall has an aperture aligned with said central aperture in said top wall and therefore with said tapped hole in said nut and said aperture in said flat stab.

9. The assembly of claim 1 wherein said bottom wall has a downward depression facing and aligned with said central aperture in said top wall.

10. The assembly of claim 1 wherein said slots in said side walls have a bottom edge 51 spaced from said top wall by a distance d selected to accommodate flat stabs of a range of thicknesses t.

11. In combination;

an electrical switch 41 with a flat terminal stab having an aperture adjacent a free end;

an electrical conductor having a terminal end for connection to said flat terminal stab;

a terminal screw and a nut having a tapped center hole into which said screw is threaded for fastening said terminal end of said electrical conductor to said terminal stab; and an electrically conductive spring clip comprising a top wall, having a pair of side edges and front and rear edges and a central aperture, side walls extending downward from said side edges of said top wall and defining slots therein, an end wall extending downward from said rear edge of said top wall and having a bottom edge, and a resilient bottom wall cantilevered from said bottom edge of said end wall under said top wall and terminating in a free edge spaced from said top wall to form with said top wall, side walls, and end wall a pocket, said nut having lateral projections which engage said slots to retain said nut in said pocket of said spring clip, said spring clip sliding onto said free end of said stab with said bottom wall and said top wall clamping said nut against said fiat stab to retain the tapped hole in said nut in registration with said aperture in said fiat stab for threaded engagement with said terminal screw inserted through said aperture in said top wall and said aperture in said flat stab to clamp said terminal end of said conductor for electrical connection to said flat stab.

12. The combination of claim 11 wherein said top wall of said spring clip has means extending axially downward around said central aperture to engage said aperture in said fiat stab to secure said spring clip on said free end of said fiat stab with said tapped hole in said nut in registration with said aperture and said stab.

13. The combination of claim 12 wherein said nut is generally rectangular with opposed sides and wherein said projections comprise ears extending laterally outward from said opposed sides to engage said slots in said side walls.

14. The combination of claim 13 wherein said slots in said side walls have a bottom edge 51 spaced from said top wall 9 by a distance d selected to accommodate fiat stabs of a range of thicknesses t.

* * * * *